(12) United States Patent
Weber et al.

(10) Patent No.: US 11,420,699 B2
(45) Date of Patent: Aug. 23, 2022

(54) FRONTAL FLEXIBILITY-ATTACHED RAPIDLY-DETACHABLE SPLASHGUARD FOR BICYCLES

(71) Applicants: Taiyo Christian Weber, Veysonnaz (CH); Kosei Paul Weber, Veysonnaz (CH)

(72) Inventors: Taiyo Christian Weber, Veysonnaz (CH); Kosei Paul Weber, Veysonnaz (CH)

( * ) Notice: Subject to any disclaimer, the term of this patent is extended or adjusted under 35 U.S.C. 154(b) by 84 days.

(21) Appl. No.: 17/133,650

(22) Filed: Dec. 24, 2020

(65) Prior Publication Data

US 2022/0204107 A1      Jun. 30, 2022

(51) Int. Cl.
*B62J 15/02*      (2006.01)

(52) U.S. Cl.
CPC ..................................... *B62J 15/02* (2013.01)

(58) Field of Classification Search
CPC ....................... B62J 17/00–06; B62J 15/00–02
See application file for complete search history.

(56) References Cited

U.S. PATENT DOCUMENTS

| | | | | |
|---|---|---|---|---|
| 500,889 A * | 7/1893 | Hadley | ..................... | B62J 15/00 280/152.3 |
| 509,032 A * | 11/1893 | Hitchcock | ................ | B62J 15/00 280/152.3 |
| 824,574 A * | 6/1906 | Newman | ................... | B62J 15/00 280/152.1 |
| 5,904,361 A * | 5/1999 | Powell | ..................... | B62J 15/02 280/152.1 |
| 5,918,904 A * | 7/1999 | Hanesworth | ............. | B62J 15/00 280/852 |
| 6,042,171 A * | 3/2000 | Hesse | ...................... | B62J 17/06 296/78.1 |
| 2018/0281883 A1 * | 10/2018 | Mckinlay | ................. | B62J 15/02 |

* cited by examiner

*Primary Examiner* — Erez Gurari
(74) *Attorney, Agent, or Firm* — Matthew D. Thayne; Thayne and Davis LLC

(57) ABSTRACT

Frontal splashguard member assemblies and related methods. In some embodiments, one or more splashguard members may be coupled to a frontal portion of a bicycle frame, such as a down tube, by way of one or more splashguard retention members and a plurality of fasteners, which fasteners may extend through openings formed in the one or more splashguard members and around the splashguard retention member.

8 Claims, 4 Drawing Sheets

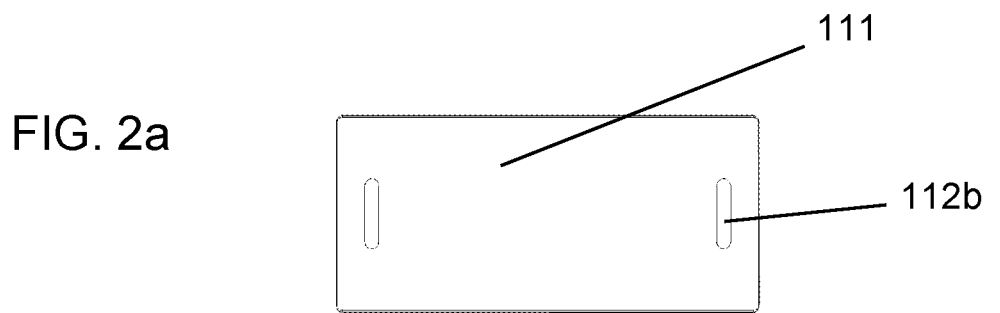
FIG. 2a
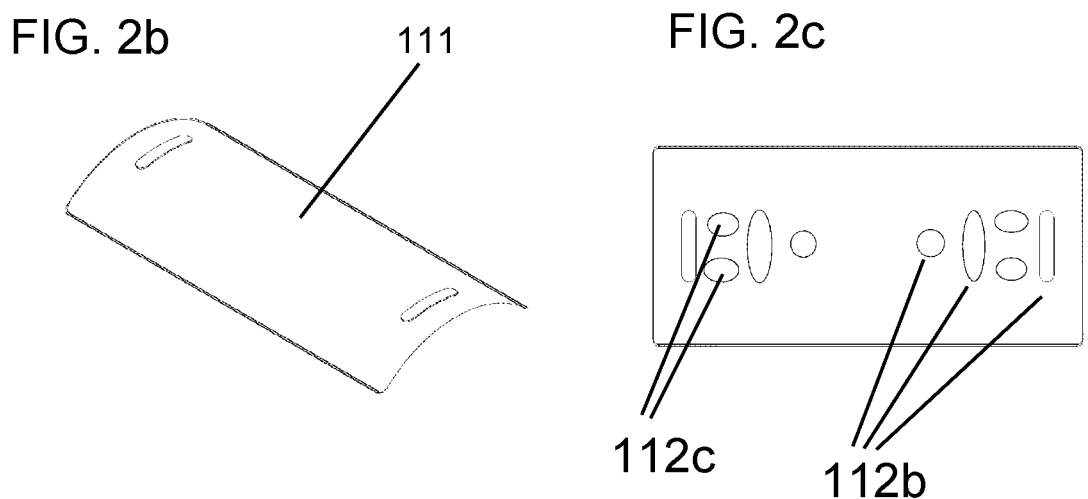
FIG. 2b
FIG. 2c
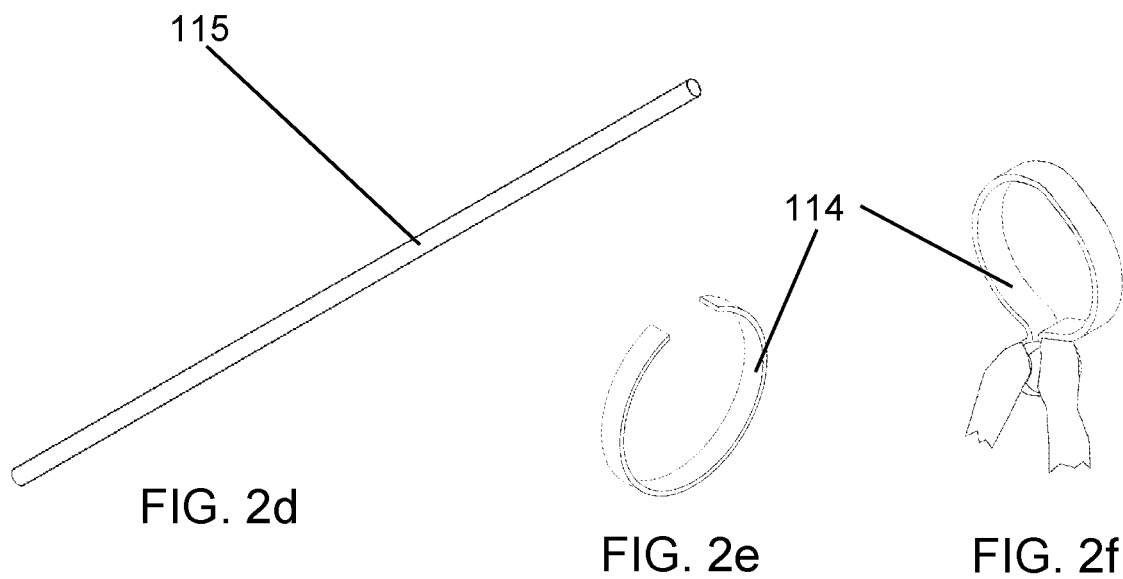
FIG. 2d
FIG. 2e
FIG. 2f

FRONTAL FLEXIBILITY-ATTACHED RAPIDLY-DETACHABLE SPLASHGUARD FOR BICYCLES

SUMMARY

Disclosed herein are various inventive methods and assemblies for bicycle splashguards and, more particularly in preferred embodiments, frontal, flexibly-attached and rapidly-detachable splashguards for bicycles and potentially other vehicles.

The assembly may lend itself to utilizing easily obtainable ecology favorable recycled parts or naturally occurring parts. For example, the splashguard members may be made of polyethylene terephthalate (PET) and may, in some embodiments and implementations, be easily obtainable from products like Charlie's Orange juice common in Australia and New Zealand and Simply Orange common to the USA. Splashguard retention members may be used to couple together multiple splashguard members and/or stabilize the entire assembly as a unit. In some embodiments, a single stick stripped of leaves from a tree or even a series of broken twigs may be used for this purpose. Fasteners may also be used to couple the splashguard members and/or splashguard retention members with the bicycle. These fasteners may, in some cases, be easily fashioned by, for example, cutting strips of old used inner tube or the like, which is something bicyclists often encounter.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 2*a* is a top plan view of a splash guard member usable with a frontal bicycle splashguard according to some embodiments.

FIG. 2*b* is an elevated perspective view of the splash guard member of FIG. 2*a*.

FIG. 2*c* is a top plan view of a splash guard member illustrating various alternative coupling openings formed therein.

FIG. 2*d* is a perspective view of a splash guard retention member according to some embodiments.

FIG. 2*e* is a perspective view of a flexible splash guard member fastener according to some embodiments.

FIG. 2*f* is a perspective view of the flexible splash guard member fastener of FIG. 2*e* following tying the ends together.

DETAILED DESCRIPTION

Further details regarding various embodiments will now be provided with reference to the drawings.

Figure 1A:
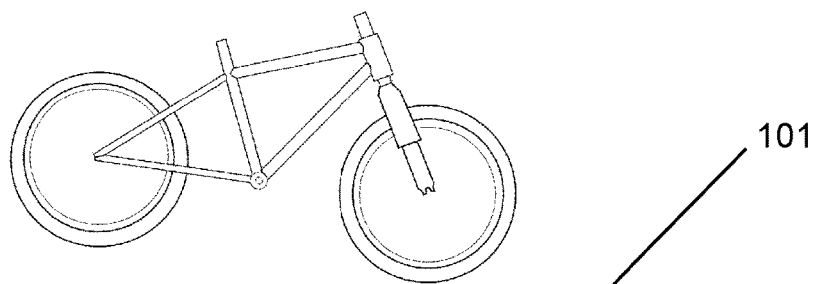
FIG. 1*a* is a side view of the frame of simple mountain bike with tires added for reference.

FIG. 1*a* depicts a frame of a typical bicycle with tires added for reference.

Figure 1B:
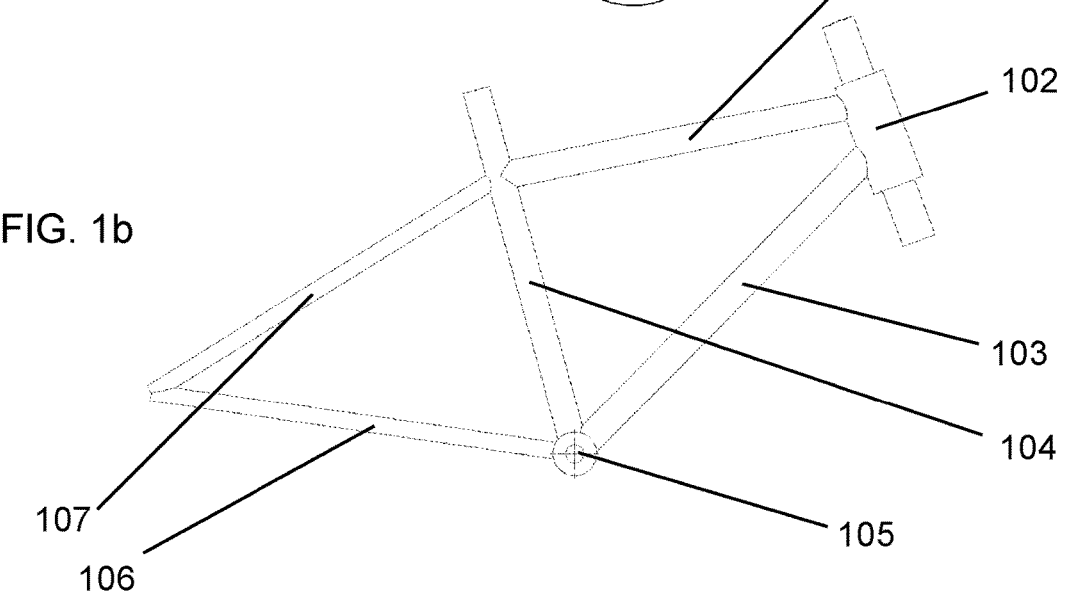
FIG. 1*b* is a side view of only the frame of the simple mountain bike of FIG. 1*a*.
Figure 1C:
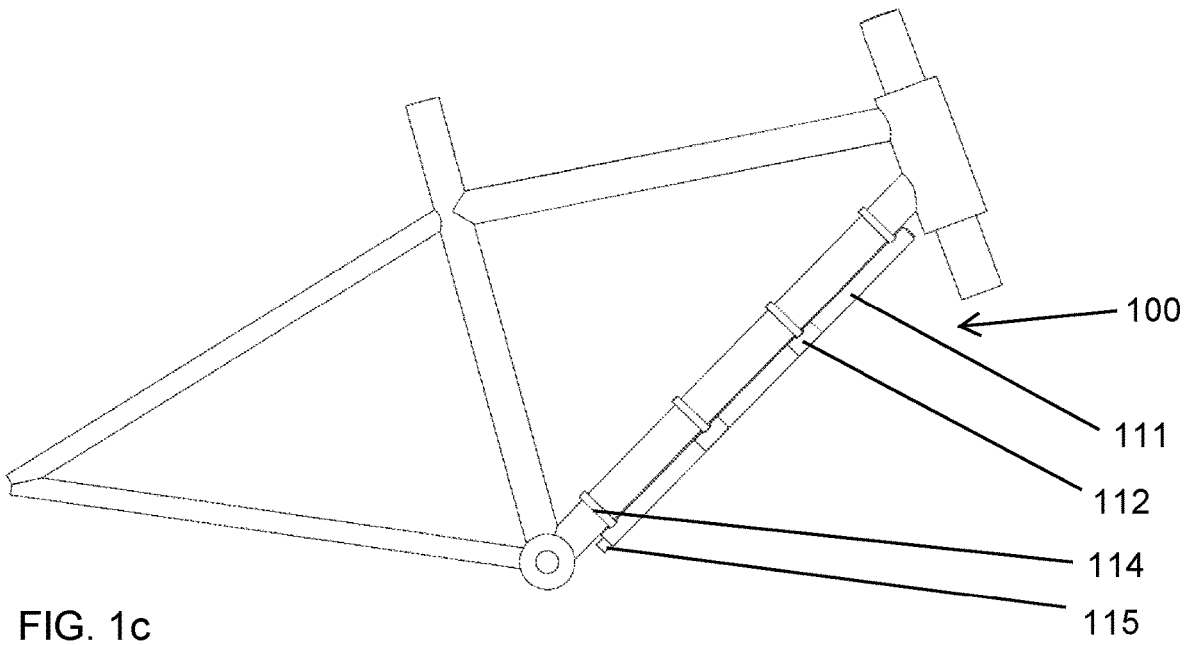
FIG. 1*c* is a side view of the frame of the simple mountain bike of FIGS. 1*a* and 1*b* with a frontal bicycle splashguard according to some embodiments attached thereto.
Figure 1D:
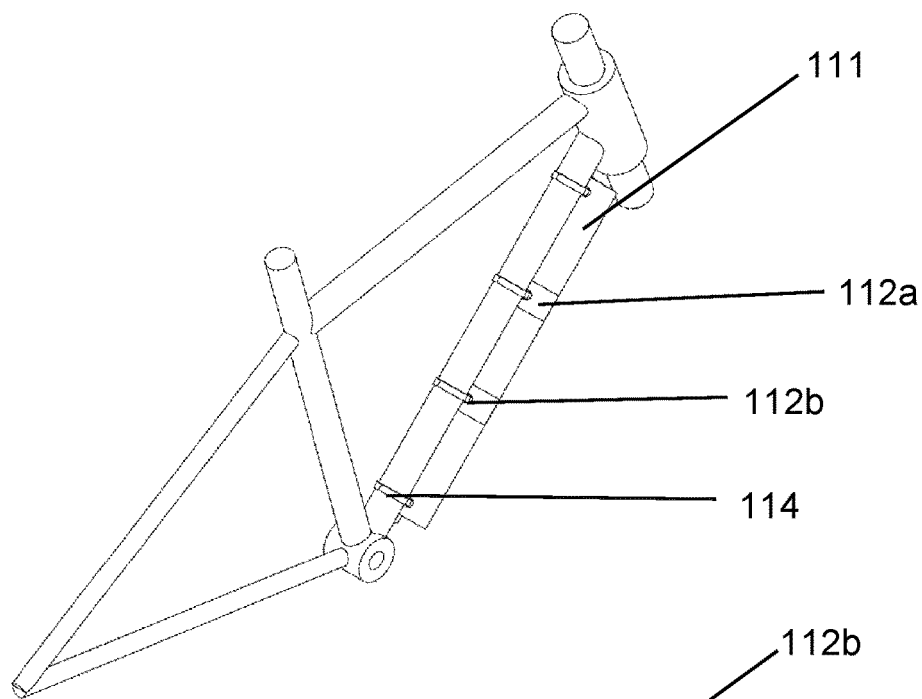
FIG. 1*d* is a rear elevated perspective view of the frame of the simple mountain bike with the frontal bicycle splashguard of FIG. 1*c* attached thereto.
Figure 1E:
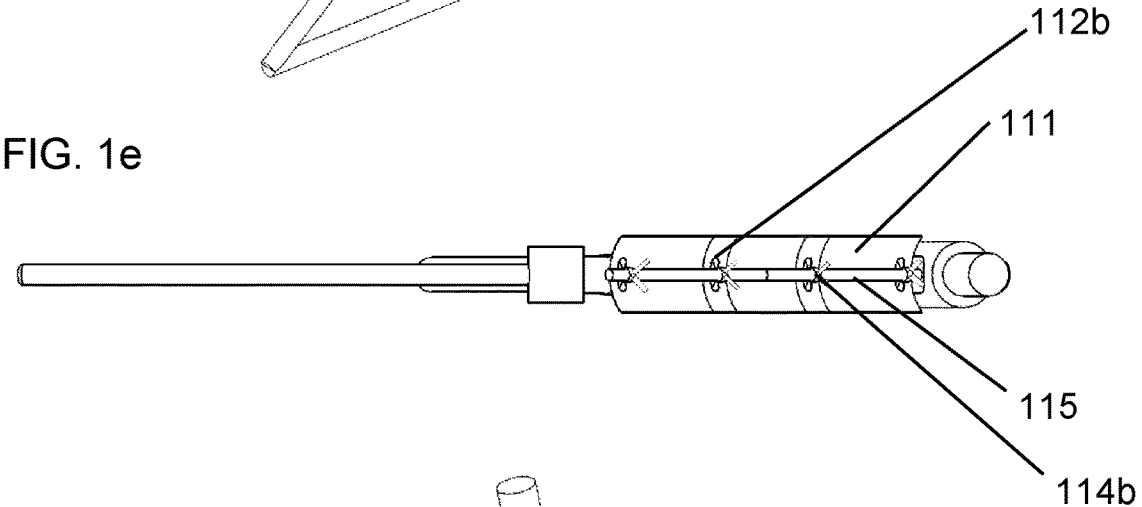
FIG. 1*e* is a bottom plan view of the simple mountain bike with the frontal bicycle splashguard of FIG. 1*d* attached.
Figure 1F:
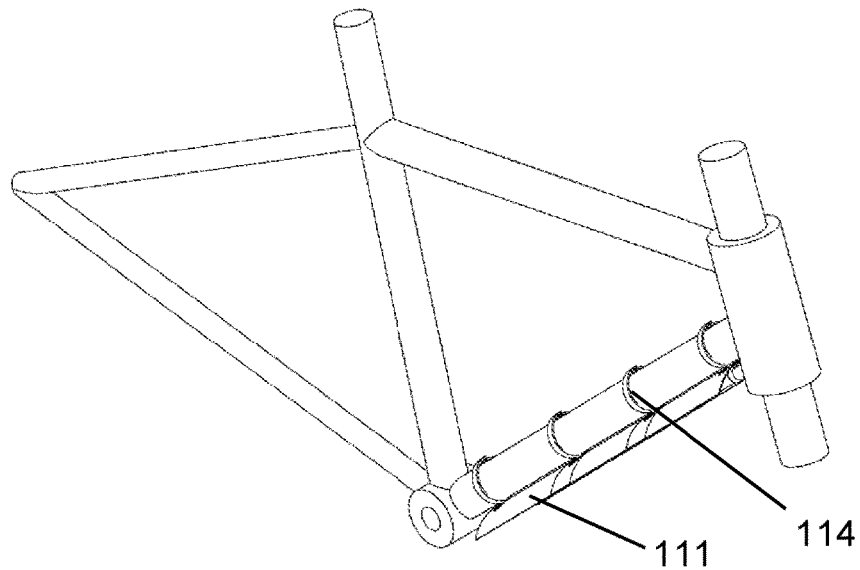
FIG. 1*f* is a front elevated perspective view of the frame of the simple mountain bike with the FIG. 1*e* attached.

FIG. 1*b* depicts only the frame of the bicycle for reference. A typical frame is comprised of a top tube 101 attached to a header tube 102 which is further attached to the down tube 103. Down tube 103 joins the seat tube 104 in the area of the bottom bracket 105.

The seat stay 107 and the chain stay 106 form the remainder of the frame.

FIGS. 1*c*-1*f* depicts an embodiment of a frontal bicycle splashguard according to some embodiments. More particularly, the depicted embodiment comprises a FFARDS (Frontal Flexibly-Attached Rapidly-Detachable Splashguard assembly) 100. Assembly 100 comprises a plurality of splashguard members 111, which comprise curved splashguard members 111 in the depicted embodiment and are therefore defined by 3 curved splashguard members 111.

Assembly 100 further comprises a splashguard member fastener 114 and a splashguard retention member 115, which may comprise, for example, a rod. Assembly 100 may comprise one or more splashguard members 111 that may be curved and, in some embodiments, may be removable for ease of cleaning, replacement, or removal for dry conditions.

Individual splashguard members 111 are depicted in FIG. 2*a*. Individual splashguard members 111 may be configured to be placed along the undersurface of a bicycle frame part, such as down tube 103, preferably with one or more openings 112*b* overlapping with a corresponding opening 112*b* from an adjacent splashguard member 111 to provide enhanced stability to the fixation to the bicycle frame. One or more splashguard member fasteners 114 may be passed around the frame's down tube 103 in areas where passage through overlapping openings 112*b* is anticipated. If the fastener 114 is a completely closed elastic structure then both ends may be stretched around the frame's down tube 103 and through the overlapping openings 112*b* located below the down tube 103 in anticipation of passing a splashguard retention member 115 sequentially through portions of the one or more fasteners 114 for retention.

Although it may be preferred to use multiple overlapping splashguard members 111, it is contemplated that, in alternative embodiments, a single splashguard member may be used. Thus, it is contemplated that, although it may be preferred to have openings for the fasteners at both opposing ends, it may be possible to only include a single opening in some embodiments. In some cases, this opening may be located at an end of the splashguard member 111 or, alternatively, at a center or central location such that a single splashguard retention member 115 can extend in both directions relative to the position of the opening.

If the fastener 114 is simply an elastic length of band then both free ends may be stretched around the frame's down tube 103 and tied manually, preferably into at least double or triple knots 114b, more preferably leaving tails of at least 2 cm which may be pulled through overlapping openings 112b. Often the more knots 114b thrown into elastic and pulled through potentially smaller holes such as 112b, the greater chance that the knots may be trapped on the opposite side of the overlapping opening. If this knot trapping happens around the overlapping holes then it may facilitate pulling the free tails to allow the splashguard retention member 115 passage sequentially quickly and easily beneath the knots 114b of the fasteners 114, thereby further allowing for immediate and thorough retention. In preferred embodiments, the assembly 100 may be removed in seconds by simply reversing the aforementioned steps.

Because the fastener may be easily made from elastic materials, such as inner-tube rubber strips or simple thick rubber bands, in preferred embodiments, the frontal bicycle splashguard, such as in preferred embodiments a FFARDS, may be very flexible, resilient, resistant to trauma and easily cleaned in seconds with water under pressure.

FIG. 2a depicts a top view of an embodiment of splashguard member 111 with a curved shape comprised of plastic with openings 112b. The shape of splashguard member 111 depicted may, in preferred embodiments, be about 20×12 cm and about 1.5 mm thick, preferably with at least one opening at each end of about 3×1 cm. The splashguard members 111 laid in series may measure, for example, from about 60 to about 80 cm depending on the length of the down tube 103 and the desire for splash coverage. In alternative embodiments, a single splashguard member 111 may be used, which may be unitary along the entire length of the down tube 103. However, this may make shipping box sizing more costly and reduce the adjustability of the assembly. The opening 112b of the embodiment in FIG. 2a is pill shaped with curved at edges to reduce trauma to the rubber SSF that may pass through it. However, as discussed below, a wide variety of shapes for these openings 112b, along with a variety in terms of the number of such openings 112b, is contemplated.

FIG. 2b depicts a perspective view of the arciform curvature of this particular embodiment of a splashguard member 111, although other contemplated embodiments of the splashguard member 111 may be of a variety of shapes, including corrugated and even flat.

FIG. 2c depicts a top view of an embodiment of an alternative splashguard member 111 with a variety of different openings, including a variety of single openings 112b on opposing sides of the splashguard member 111 and possible dual openings 112c on these opposing sides. Openings 112b and 112c of FIG. 2c illustrate the wide scope of usable openings 112, including ellipsoidal and circular. In other embodiments, virtually any shape of opening is contemplated, including trapezoidal and geometric. A multiplicity of holes at the ends of varying distances from the ends allows for greater adjustability of overlapping to fit a variety of down tube sizes.

In embodiments comprising a plurality of adjacent holes 112b on both ends, this feature may eliminate the need for using a splashguard retention member 115 as the material in the center between the two holes 112b may function as an impediment to knot migration if a knot is used to secure an elastic fastener 114.

FIG. 2d depicts perspective view of a rod-shaped embodiment of a splashguard retention member 115. Other contemplated embodiments of splashguard retention members may be of a variety of shapes including rings, ovals, cotter pin, short rods, portions of spiral springs, and virtually any shape that can fit between the splashguard member 111 and the down tube yet not fit through openings 112. The length of a rod-shaped splashguard retention member 115 may vary from the entire length of the down tube to just a few centimeters. For example, if shortened rods/retention members are used, each individual smaller rod may be configured to prevent or at least inhibit the fastener from passing through any portion of opening 112.

FIG. 2e depicts a perspective view of a flexible fastener 114, which may comprise a cut portion of a rubber inner-tube in some embodiments.

FIG. 2f depicts a perspective view of a flexible fastener illustrating the conformation the fastener 114 takes when it passes around and through holes 112 and around the down tube.

Figure 2G:
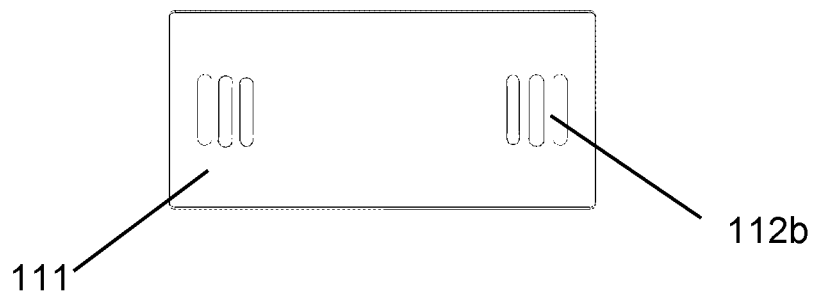
FIG. 2*g* is a plan view of an alternative splash guard member having a plurality of pill-shaped openings at both opposing ends to provide flexibility for accommodating various bicycle sizes.

FIG. 2g is a plan view of an alternative splash guard member 111 having a plurality of pill-shaped openings 112b at both opposing ends to provide flexibility for accommodating various bicycle sizes. By providing a series of openings, a user may not only be able to accommodate various bicycle sizes, but may also be able to customize the length of the full splash guard assembly by varying the amount of overlap with an adjacent splash guard member 111.

Figure 2H:
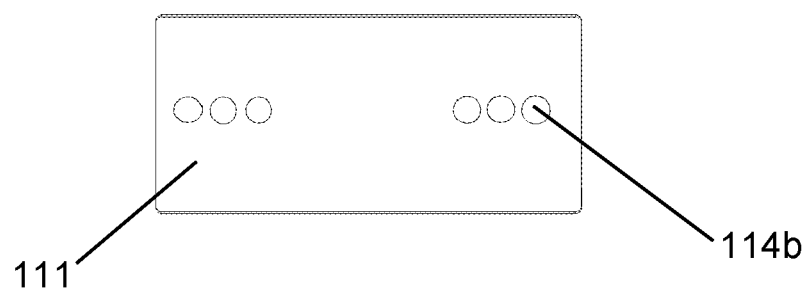
FIG. 2*h* is a plan view of another alternative splash guard member having a plurality of circular openings at both opposing ends.

FIG. 2h is a plan view of another alternative splash guard member 111 having a plurality of circular openings 114b at both opposing ends. Again, this may allow for customization according to the size of a user's bicycle and/or desired configuration. By providing circular openings, the assembly may be less prone to shifting from side to side during use.

Figure 2I:
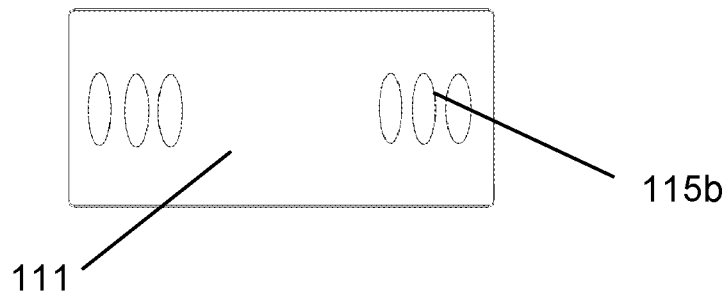
FIG. 2*i* is a plan view of still another alternative splash guard member having a plurality of oval-shaped openings at both opposing ends.

FIG. 2i is a plan view of still another alternative splash guard member 111 having a plurality of oval-shaped openings 115b at both opposing ends. Oval shaped openings 115b may be useful to provide a larger central region and thinner ends, which may promote central positioning and inhibit, but not entirely prevent, shifting.

Figure 3:
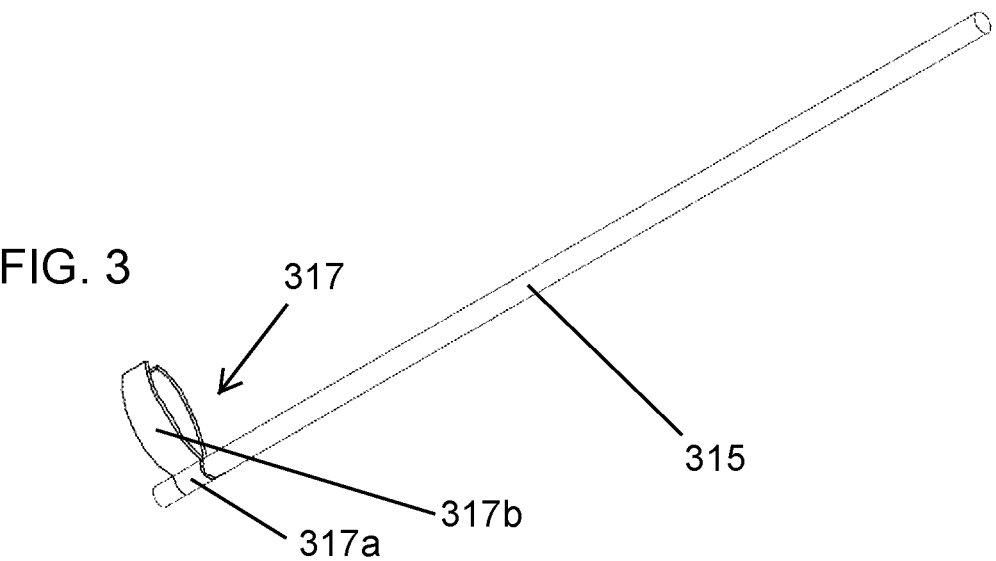
FIG. 3 is perspective view of an alternative splash guard retention member including a clip for coupling to a bicycle frame.

FIG. 3 depicts another splash guard retention member 315 along with an alternative splash guard fastener 317 that may be used to secure splash guard retention member 315 and/or a splash guard member to a portion of a bicycle frame. In the depicted embodiment of FIG. 3, the splash guard fastener 317 comprises a flexible clip that may be configured to resiliently expand around the bicycle's down tube, for example, and secure the splash guard retention member 315 and/or the splash guard member thereto. Clip 317 comprises a first section 317a that may be configured to slide onto splash guard retention member 315 and a second section 317b, which is preferably larger in terms of the dimensions of the opening so as to fit around a portion of a bicycle frame. The second section 317b may, as shown in FIG. 3, comprise a pair of resilient flaps defining a split ring type configuration.

The invention claimed is:

1. A front splashguard assembly for a bicycle, comprising:
a splashguard member configured to extend along a down tube of a bicycle comprising:
a first end;
a second end opposite the first end;
an outer surface configured to face away from the down tube;
an inner surface configured to face the down tube; and
at least one opening;
a splashguard retention member configured to extend along the outer surface of the splashguard member; and a plurality of flexible fasteners, wherein each of the plurality of flexible fasteners is configured to extend through at least one opening of the splashguard member and around the splashguard retention member to secure the splashguard retention member to the splashguard member and to secure the splashguard member to the down tube of the bicycle.

2. The front splashguard assembly of claim 1, wherein the at least one opening is positioned adjacent to the first end.

3. The front splashguard assembly of claim 2, further comprising at least one opening positioned adjacent to the second end.

4. The front splashguard assembly of claim 3, wherein the splashguard member comprises a plurality of openings positioned adjacent to the first end and a plurality of openings positioned adjacent to the second end.

5. The front splashguard assembly of claim 4, wherein the plurality of openings positioned adjacent to the first end comprises at least one first opening having a first shape and at least one second opening having a second shape that differs from the first shape.

6. The front splashguard assembly of claim 1, further comprising a second splashguard member configured to extend along the down tube of the bicycle adjacent to the splashguard member, wherein the splashguard member comprises:
    a first end;
    a second end opposite the first end;
    an outer surface configured to face away from the down tube;
    an inner surface configured to face the down tube; and
        at least one opening positioned adjacent to the first end;
            wherein the second splashguard member is configured to be coupled with the splashguard member by aligning at least one opening of the second splashguard member at the first end with at least one opening of the splashguard member at the second end such that the splashguard member and the second splashguard member together form a unitary splashguard of a length longer than a length of either the splashguard member or the second splashguard member alone.

7. The front splashguard assembly of claim 6, wherein the second splashguard member comprises a plurality of openings positioned at the first end.

8. The front splashguard assembly of claim 1, wherein the splashguard member comprises a curved surface.

* * * * *